(12) United States Patent
Livingston

(10) Patent No.: US 10,009,415 B2
(45) Date of Patent: Jun. 26, 2018

(54) SYSTEM AND METHOD FOR DISTRIBUTION AND CONSUMPTION OF CONTENT

(71) Applicant: QUANTIFY LABS, INC., Toronto (CA)

(72) Inventor: Blair Livingston, Toronto (CA)

(73) Assignee: QUANTIFY LABS, INC., Toronto (CA)

( * ) Notice: Subject to any disclaimer, the term of this patent is extended or adjusted under 35 U.S.C. 154(b) by 264 days.

(21) Appl. No.: 14/528,494

(22) Filed: Oct. 30, 2014

(65) Prior Publication Data

US 2015/0127711 A1     May 7, 2015

Related U.S. Application Data

(60) Provisional application No. 61/898,909, filed on Nov. 1, 2013.

(51) Int. Cl.
*G06F 15/16*     (2006.01)
*H04L 29/08*     (2006.01)

(52) U.S. Cl.
CPC .............. *H04L 67/10* (2013.01); *H04L 67/32* (2013.01); *H04L 67/306* (2013.01)

(58) Field of Classification Search
CPC ........ G06Q 30/02; G06Q 30/06; G06Q 10/06; G06Q 20/405; H04L 67/10; H04L 67/22; H04L 12/1467
See application file for complete search history.

(56) References Cited

U.S. PATENT DOCUMENTS

| | | | | |
|---|---|---|---|---|
| 7,330,830 B1* | 2/2008 | Lamoureux | ............ | G06Q 30/00 705/30 |
| 8,255,949 B1* | 8/2012 | Bayer | ................ | G06Q 30/0241 725/32 |
| 8,296,380 B1* | 10/2012 | Kelly | ................ | G06F 17/30528 703/23 |
| 8,589,495 B1* | 11/2013 | Beckert | .................... | G06F 9/542 709/204 |
| 2010/0205029 A1* | 8/2010 | Asherman | ............ | G06Q 20/382 705/64 |
| 2012/0030018 A1* | 2/2012 | Passmore | .......... | G06F 17/30702 705/14.52 |
| 2013/0024307 A1* | 1/2013 | Fuerstenberg | ......... | G06Q 20/40 705/18 |
| 2013/0073356 A1* | 3/2013 | Cooper | .................. | G06Q 30/02 705/14.5 |
| 2013/0124263 A1* | 5/2013 | Amaro | ................... | G06Q 30/02 705/7.34 |
| 2013/0231974 A1* | 9/2013 | Harris | ................ | G06Q 30/0201 705/7.29 |

(Continued)

*Primary Examiner* — Shean Tokuta
(74) *Attorney, Agent, or Firm* — Perry + Currier Inc.

(57) ABSTRACT

Content is received from content producer computers and distributed by the system to content consumer computers via a computer network. The system monitors for indications of interactions with the content by the content consumer computer. The system receives out-of-band transaction data, such as financial transaction data, of content consumer parties associated with the content consumer computers. The system generates correlations between the interactions with the content and the out-of-band transaction data, and outputs the correlations to the content producer computers.

18 Claims, 19 Drawing Sheets

(56) References Cited

U.S. PATENT DOCUMENTS

| | | | |
|---|---|---|---|
| 2013/0254008 A1* | 9/2013 | Ovick | G06Q 30/0225 |
| | | | 705/14.26 |
| 2014/0032304 A1* | 1/2014 | Kent | G06Q 30/02 |
| | | | 705/14.43 |
| 2014/0067702 A1* | 3/2014 | Rathod | G06Q 10/10 |
| | | | 705/319 |
| 2014/0258243 A1* | 9/2014 | Bell | H04L 67/306 |
| | | | 707/690 |

* cited by examiner

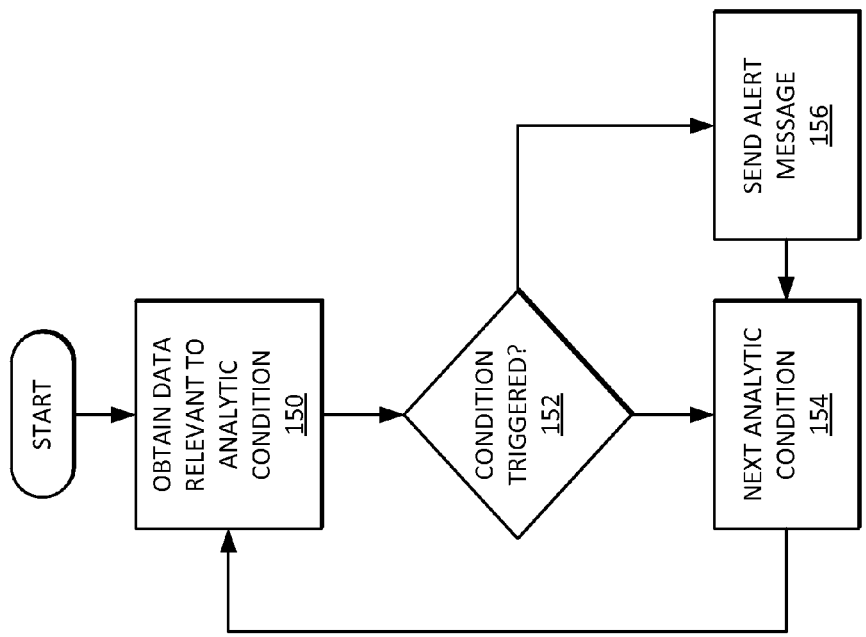

MY DISTRIBUTIONS

209

| NAME ∧ | DESCRIPTION | EMAIL | 202 OPEN RATE | 204 SUBSCRIBERS | 205 MANAGE |
|---|---|---|---|---|---|
| CFA Financial Newsbrief | A daily email briefing of all the financial and investment news from around the globe that affects your world. 200 | cfa_newsbrief@demoquantify-labs.net | 0% | 6 | Add Subscriber |
| Deals in mining | | deals@demoquantify-labs.net | 0% | 0 | Add Subscriber |
| End of Week Summary | | endofweek@demoquantify-labs.net | 0% | 0 | Add Subscriber |
| Morning Mining Recap | Morning mining equity recap – market movers and events | morning_recap@demoquantify-labs.net | 74% | 23 | Add Subscriber |

Showing 1 to 4 of 4 entries

← Previous | 1 | Next →

My Profile | ✱ | Sign Out

CREATE NEW DISTRIBUTION — 207

Search  206

Chat with us!  208

MY DISTRIBUTIONS
MY SUBSCRIPTIONS
DISCOVER
DESK OVERVIEW
COMPLIANCE

| | GO BACK // MANAGE SUBSCRIBERS: CFA FINANCIAL NEWSBRIEF | | My Profile ⚙ Sign Out |
|---|---|---|---|
| MY DISTRIBUTIONS | [EXPORT SUBSCRIBERS] [ADD SUBSCRIBER] [UPLOAD USER LIST] ← 232 | | |
| MY SUBSCRIPTIONS | | 230 | 234 |
| DISCOVER | NAME ∧ | TITLE | COMPANY | EMAIL | MANAGE |
| | Andrew Hegarty | Designer | Quantify Labs | andrew@quantify-labs.com | Remove |
| DESK OVERVIEW | Atef Chauchury | Intern | Quantify Labs | atef@quantify-labs.com | Remove |
| COMPLIANCE | Mike Pettypiece | Developer | Quantify Labs | mike@quantify-labs.com | Remove |
| | Steve Dodd | Developer | Quantify Labs | steve@quantify-labs.com | Remove |
| | Tim O'Conner | Developer | Quantify Labs | tim@quantify-labs.com | Remove |
| | Udesh Senaratne | Developer | Quantify Labs | udesh@quantify-labs.com | Remove |
| | Showing 1 to 6 of 6 entries | | | | [Chat with us!] |

DISCOVER

256
Filters: | All Products ▼ | All Sectors ▼ |

Search 254

| TITLE ▲ | DESCRIPTION | AUTHOR | BROKERAGE 250 | SECTOR | PRODUCT | 252 SUBSCRIBE |
|---|---|---|---|---|---|---|
| Advisor Update | An update to advisors | Blair Livingston | Quantify Labs | Energy | Equity | Subscribe |
| Daily Forestry Note | A daily overview of lumber companies in British Columbia | Udesh Senerotne | Quantify Labs | Other | Equity | Unsubscribe |
| End of Week Mining Summary | End of week summary of junior mining activity in Canada | Blair Livingston | Quantify Labs | Metals & Mining | Equity | Subscribe |
| European debt | Overview of Euro zone debt adjustment | Tim O'Connor | Quantify Labs | Financial | Economic | Subscribe |
| Evening Gold Note | Gold Notes sent @ 5:00 pm | Mike Pettypiece | Quantify Labs | Metals & Mining | Equity | Unsubscribe |
| Formation 3 | Update to formation 3 | Blair Livingston | Quantify Labs | Metals & Mining | Equity | |

MY DISTRIBUTIONS
MY SUBSCRIPTIONS
DISCOVER
DESK OVERVIEW
COMPLIANCE

My Profile · Sign Out

FIG. 12f

| X | PEOPLE | DISTRIBUTIONS | CLIENTS | FIRMS 268 | | | My Profile | ⚙ | Sign Out |
|---|---|---|---|---|---|---|---|---|---|

MY DISTRIBUTIONS
MY SUBSCRIPTIONS
DISCOVER

DESK OVERVIEW

COMPLIANCE

269
Total number of people: 4 // Desks: 2 // Overall open rate: 56% // Overall click rate: 24%

| Search | | 🔍 | Forever ▾ 262 | 266 📅 Or Choose A Date Range |
|---|---|---|---|---|
| NAME ▲ | TITLE | SUBSCRIBERS 260 264 | EMAILS | OPEN RATE | CLICK RATE |

| NAME ▲ | TITLE | SUBSCRIBERS | EMAILS | OPEN RATE | CLICK RATE |
|---|---|---|---|---|---|
| Sales | | | | | |
| Tim O'Connor | Analyst | 3 | 4 (7) | 57% (4) | 29% (2) |
| Udesh Seneratne | Analyst | 80 | 28 (304) | 30% (90) | 13% (29) |
| Trading | | | | | |
| Andrew Hegarty | Analyst | 10 | 33 (229) | 63% (144) | 10% (42) |
| Mike Pattyplace | Analyst | 30 | 104 (1869) | 75% (1406) | 39% (734) |

Showing 1 to 4 of 4 entries

Chat with us!  ◁

FIG. 12g

| X | | | | My Profile ⚙ Sign Out |
|---|---|---|---|---|
| MY DISTRIBUTIONS | | | | |
| MY SUBSCRIPTIONS | EXPORT DATA — 274 | | Search 272 | |
| DISCOVER | | | | |
| | SENT TIME ∧ | SENDER EMAIL | DISTRIBUTION EMAIL 270 | RECIPIENT EMAIL | SUBJECT |
| | 2013-04-17 15:04 | mike@quantify-labs.com | demo_test@demoquantify-labs.net | Darren.Forte@blackstone.quantify.net | Note-89 |
| | 2013-04-17 15:04 | mike@quantify-labs.com | demo_test@demoquantify-labs.net | Diane.Ryan@norwoodpartners.quantify.net | Note-89 |
| | 2013-04-17 15:04 | mike@quantify-labs.com | demo_test@demoquantify-labs.net | William.Miller@breithorncapitalmanagement.quantify.net | Note-89 |
| DESK OVERVIEW | 2013-04-17 15:04 | mike@quantify-labs.com | demo_test@demoquantify-labs.net | Wm.Kost@trowe.quantify.net | Note-89 |
| COMPLIANCE | 2013-04-17 15:04 | mike@quantify-labs.com | demo_test@demoquantify-labs.net | Jay.Stephenson@austildexia.quantify.net | Note-89 |
| | 2013-04-17 15:04 | mike@quantify-labs.com | demo_test@demoquantify-labs.net | Carolyn.Wooten@blackstone.quantify.net | Note-89 |
| | 2013-04-17 15:04 | mike@quantify-labs.com | demo_test@demoquantify-labs.net | Daniel.Gonzalez@argandcapitaladvisors.quantify.net | Note-89 |
| | 2013-04-17 15:04 | mike@quantify-labs.com | demo_test@demoquantify-labs.net | Mia.Joyce@trowe.quantify.net | Note-89 |
| | | | | Chat with us! | |

FIG. 12h

BLAIR LIVINGSTON 280

Analyst at Quantify Labs
Products: EQUITY, Equity // Sectors: Other, MINING, Metals & Mining
Distribution Lists: 4 // Subscribers: 29

| TITLE ∧ | DESCRIPTION |
|---|---|
| CFA Financial Newsbrief | A daily email briefing of all the financial and investment news from around the globe that affects your world. 282 |
| Deals in mining | n/a |
| End of Week Summary | n/a |
| Morning Mining Recap | Morning mining equity recap - market movers and events |

Showing 1 to 4 of 4 entries

← Previous  1  Next →

PRODUCT   SECTOR

Equity    Other

Chat with us!

Questions? We'd love to chat!

208

[Type here and hit enter to chat]

POWERED BY OLARK

MY DISTRIBUTIONS
MY SUBSCRIPTIONS
DISCOVER
DESK OVERVIEW
COMPLIANCE

My Profile   ⚙   Sign Out

Search

SYSTEM AND METHOD FOR DISTRIBUTION AND CONSUMPTION OF CONTENT

CROSS-REFERENCE TO RELATED APPLICATIONS

This application claims priority to U.S. 61/898,909, the entirety of which is incorporated herein by reference.

FIELD

The present invention relates to a system and method for distributing information. More specifically, the present invention relates to a system and method for collecting and distributing information and for tracking the access and usage of such information.

BACKGROUND

In a variety of industries, information is created and distributed as an adjunct to sales of related products and services. For example, in the financial industry (e.g.—stock markets, money markets, etc.) a variety of information ("content") is produced, such as research reports, news summaries, market commentaries, etc., by the market participants selling financial instruments and is distributed to market participants that might trade in those associated financial instruments. Presently, interactions between the various parties associated with financial information creation, delivery, and consumption is limited. For example, content producers may maintain mailing lists to the members of which they email their content at intervals. While such mailing list-based systems can be used to distribute content, the content producer has no way to measure the effectiveness of that content in influencing the recipients to deal with the content provider. Similarly, a market participant may be interested in the type of information that a content producer is distributing, but the content producer may not have contact with that market participant and the market participant may not be on the mail list of the content producer, and in fact may not be aware of the mailing list at all, and thus the market participant will not receive the information and the content producer will miss the chance to perform a transaction with the market participant.

To date, there has not been an acceptable and/or viable method or system for making content available and/or for tracking its usage by recipients. Finding distribution channels for new content, discovering new content and sources thereof, and associating delivery of such content with usage is currently achieved, at best, in an ad-hoc manner using disparate tools and systems.

Moreover, present technologies for distributing content may waste computer processing and network resources. For instance, when content is sent to a party that does not desire or require the content, this often results in unneeded network traffic in sending the content to the disinterested party and, often, the disinterested party responding with a request to stop sending the content and/or forwarding the content to another party that may be interested. Further, systems that send such content demand substantial processing resources to generate and send content-bearing messages and manage interactions with receiving parties, including disinterested parties. As the volume of content distribution increases, these technical problems likewise increase.

SUMMARY

The present invention provides a novel system and method for content distribution that obviates or mitigates at least one disadvantage of the prior art.

According to one aspect of the invention, a content distribution system includes a content subscription manager configured to control distribution of content provided by content producer computers to content consumer computers over a computer network, a content producer interface configured to connect the content subscription manager to the content producer computers, a content consumer interface configured to connect the content subscription manager to the content consumer computers, and an analytics engine configured to receive indications of interactions with content by the content consumer computers and configured to receive out-of-band transaction data of content consumer parties associated with the content consumer computers. The analytics engine is further configured to generate correlations between the interactions with the content and the out-of-band transaction data and output the correlations to the content producer computers.

According to another aspect of the invention, a method for content distribution includes receiving content from a content producer computer, distributing the content to a content consumer computer via a computer network, receiving an indication of an interaction with the content by the content consumer computer, receiving out-of-band transaction data of a content consumer party associated with the content consumer computer, generating a correlation between the interaction with the content and the out-of-band transaction data, and outputting the correlation to the content producer computer.

BRIEF DESCRIPTION OF THE DRAWINGS

Preferred embodiments of the present invention will now be described, by way of example only, with reference to the attached Figures.

FIG. 7 is a flowchart of a method for triggering analytic-based alerts.

FIG. 8 shows an example of an analytic-based alert.

FIGS. 12*a*-12*i* are views of user interfaces of the content distribution system.

DETAILED DESCRIPTION

Figure 1:
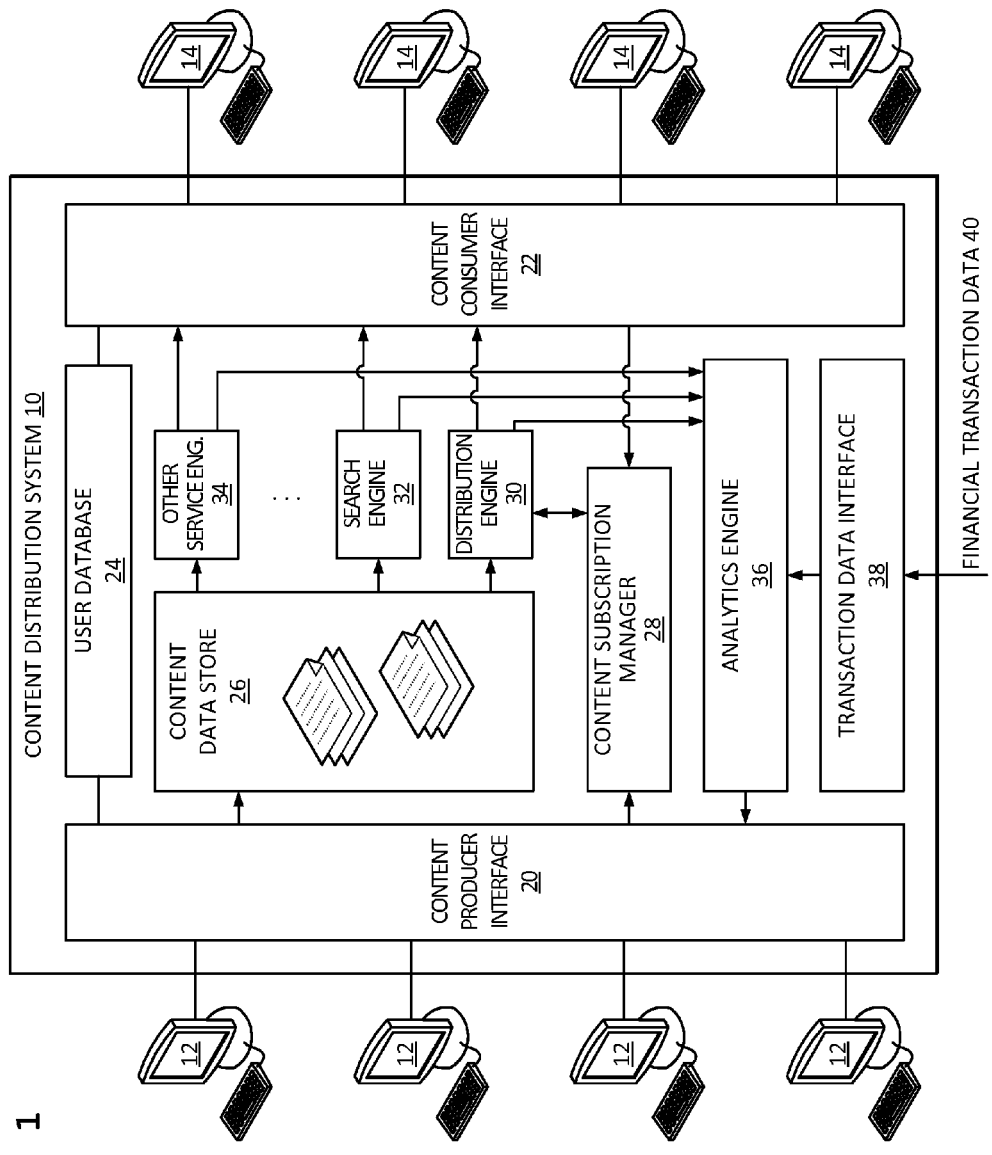
FIG. 1 is a block diagram of a content distribution system.

FIG. 1 shows a content distribution system 10 according to an embodiment of the present invention. FIG. 1 is schematic and illustrative, and functionality described for various blocks may be split into smaller blocks or combined into larger blocks. Connections between blocks are representative of information communication, with arrows illustrating the generally contemplated flow of information. Blocks, connections, and arrows are not to be taken as limiting.

The content distribution system 10 includes one or more computers, which may be referred to as servers. When multiple computers are used, they may be communicatively connected via a public computer network, such as the Internet, or a private network such as a local-area network (LAN) or virtual private network (VPN). The components of the content distribution system 10 that will be described herein can each be implemented on one or more of the computers.

A plurality of content producer computers 12 can connect to the content distribution system 10 to interact with the system 10. The content producer computers 12 can connect to the system 10 by way of a public computer network, such as the Internet, or via a private computer network or a combination of public and private networks. Similarly, a plurality of content consumer computers 14 can connect to the content distribution system 10 to interact with the system 10. As with the content producer, the content consumer computers 14 can connect to the system 10 by way of public private computer networks, or combinations thereof.

The content distribution system 10 includes a content producer interface 20 configured to receive commands and data from the content producer computers 12 and output data and other information to the content producer computers 12. The content producer interface 20 can include a web server configured to serve webpages, which may include a login page for secure login by users of the content producer computers 12. Webpages served by the content producer interface 20 can be script-generated using various techniques and combinations thereof, such as server-side scripting (e.g., Ruby on Rails, ASP, PHP, among many others) and client-side scripting (e.g., JavaScript, jQuery, Ajax, among others).

The content distribution system 10 also includes a content consumer interface 22 configured to receive commands and data from the content consumer computers 14 and output data and other information to the content consumer computers 14. The content consumer interface 22 can include a web server, which can be the same web server used at the content producer interface 20 or can be a different web server configured to serve webpages. Other features and aspects of the content consumer interface 22 can be the same as or similar to the content producer interface 20.

The content producer and content consumer computers 12, 14 can each include a user agents, such as a web browser (e.g., Firefox, Internet Explorer, Google Chrome, etc.) configured to communicate with the respective interface 20, 22 and email clients (e.g., Microsoft Outlook, Gmail clients, etc.) configured to send and receive email with email servers (e.g., Microsoft Exchange, Gmail, etc.). Email servers are contemplated to form part of the network of each content producer and content consumer computer 12, 14.

Interactions between the computers 12, 14 and the interfaces 20, 22 can occur via the Web, email, a combination of such, as well as with similar technologies.

The interfaces 20, 22 and computers 12, 14 can additionally or alternatively be configured to use other communication techniques. For example, the interfaces 20, 22 communicate data according to known or new protocols and the computers 12, 14 can be provided with applications that consume such data and provide commands to the interfaces 20, 22.

As will be discussed in further detail herein, the content producer computers 12 provide content to the content distribution system 10 and the content consumer computers 14 consume the content. In this embodiment, the content is related to the financial industry and can include content such as newsletters, alerts, special bulletins, articles, research papers, morning notes, etc. It is contemplated that content producer users create or otherwise obtain the content and upload it to the content distribution system 10. In a financial information embodiment, examples of content producer users include employees of equity trading firms, financial advisors, and the like. In this embodiment, the term "content producer" refers to users, parties, firms, and components involved in selling financial services, such as trade brokering services, which are often referred to as "sell side" users. Similarly, in this embodiment the term "content consumer" refers to users, parties, firms, and components involved in buying financial services. Content consumer users may be investors or representatives thereof, fund managers, and the like, which are often referred to as "buy side" users. Accordingly, buy-side users can use the content consumer computers 14 to obtain the content provided by the various sell-side users. The content itself may be of interest to content consumer users and, further, may assist content producer users in selling financial services to content consumer users.

Figure 6:
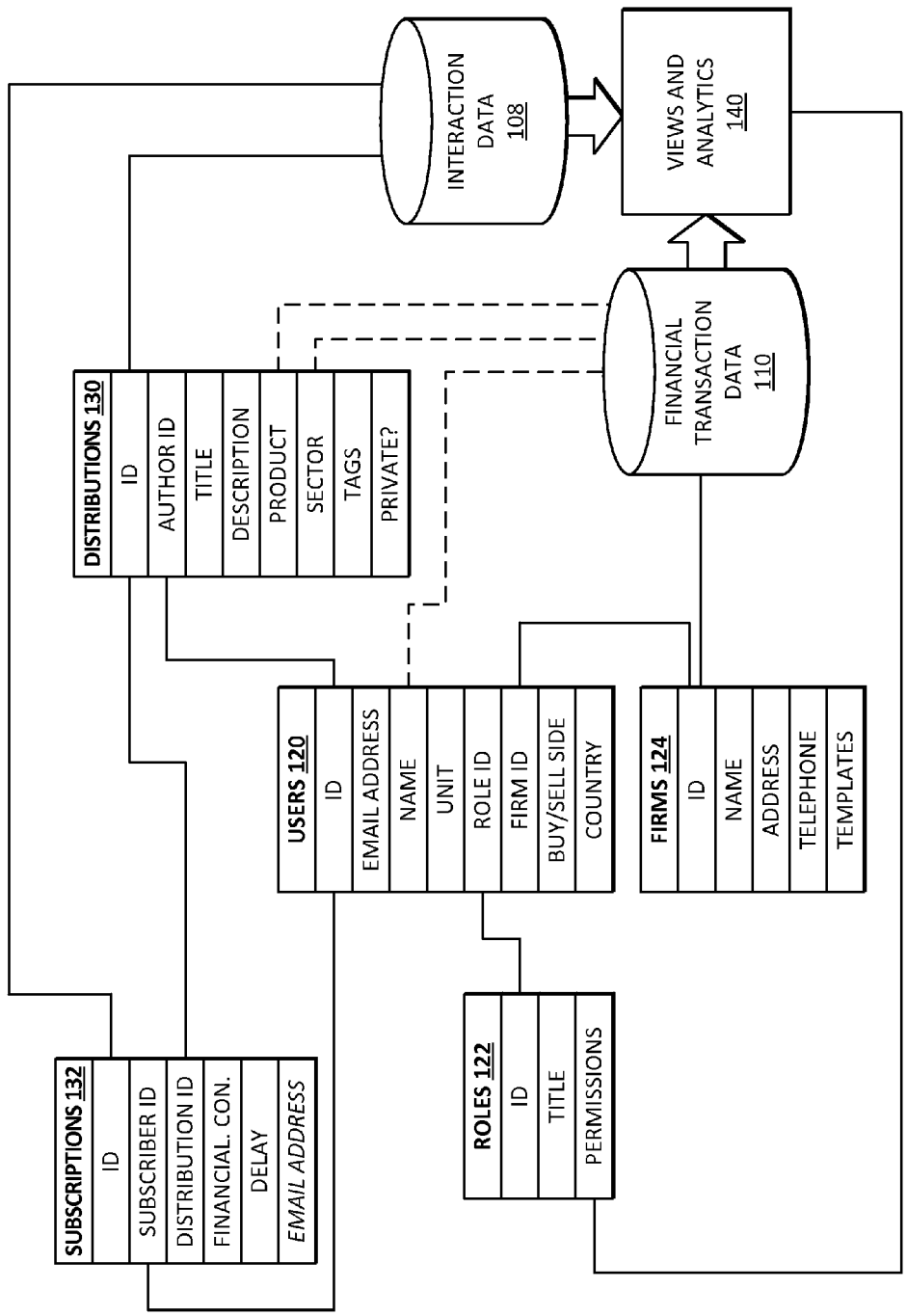
FIG. 6 is a schematic diagram of a data structure for the content distribution system.

The content distribution system 10 further includes a user database 24 configured to store relevant content producer and content consumer user information, such as username, password, contact information (e.g., email address, telephone number, fax number, etc.), firm, mailing address, and real name. The user database 24 can store relevant information such as firm information, and associations between users and firms. For instance, several users may belong to the same firm and the user database 24 can indicate such. The user database 24 can further store roles of various users, such as trader, manager, administrator, director, president, etc. Roles can be associated with permissions within the content distribution system 10. The user database 24 can explicitly identify whether users and firms are content producer or content consumer. Lastly, each user and firm can be provided with unique identification information (an ID) that uniquely identifies the user or firm within the system 10. Components of the system 10 can use the ID as an index to lookup information about users and firms, such as email address, to facilitate content distribution. FIG. 6 shows, among other things, an example data structure of the user database 24.

The user database 24 may also store non-password authentication credentials, such as identity certificates. In order to access the content distribution system 10, users at the computers 12, 14 must first login and have their credentials verified. It is contemplated that access to the content distribution system 10 is restricted to users whose real-life identities have been confirmed. Accordingly, the user database 24 can include an administrator-editable field indicating whether a user's real-life identity has been confirmed or whether such confirmation is pending.

The content distribution system 10 further includes a content data store 26. The content data store 26 is configured to store the items of content discussed above. The content data store 26 may include one or more databases and may include local and/or distributed (e.g., "cloud") storage. The content data store 26 can be configured to index the stored content by any number of suitable criteria including: date written, date published, title, description, author, author's firm, industry sector, type of financial product (e.g., equity, derivative, etc.), tag(s) or keyword(s), word length, and other relevant metadata. Content can include text and images and may be in the form of stored email messages, hypertext markup language (HTML) documents or fragments, PDF files, text files, or similar. Content may include hyperlinks to other content stored in the data store 26 or elsewhere on the Internet. Content may be stored in association with relevance values, which can be associated with one or more of sector and product.

The content distribution system 10 further includes a content subscription manager 28. The content subscription manager 28 controls how and whether content from the content data store 26 is available to the content consumer computers 14. The content subscription manager 28 is configured to handle content consumer requests to obtain, subscribe to, and unsubscribe from various content. For example, a content consumer user may wish to request delivery of a particular content producer newsletter email. Content producer users can also use the content subscription manager 28 to control distribution of their content. That is, the content subscription manager 28 is configured to handle content producer requests to publish, distribute, and cease distributing content. As will be discussed in detail below, the content subscription manager 28 also provides various rules as to whether and how content from various content producer users can be provided to various content consumer users.

The content distribution system 10 further includes a content distribution engine 30. The distribution engine 30 is configured to distribute content in conformance with settings and rules established at the content subscription manager 28. The distribution engine 30 effects actual delivery of the content provided by the content producer computers 12 to the content consumer computers 14. The distribution engine 30 can be configured to generate and send email or other types of messages containing content stored at the data store 26. The term "engine" is used herein to denote one or more methods or processes configured to arrive at a general goal, and is not to be taken as limiting to particular technology or implementation.

The content distribution system 10 can further include a search engine 32. The search engine 32 can be configured to receive queries from content consumer computers 14 and return relevant items of content stored in the data store 26. The search engine 32 can reference any indexing of the content (e.g., author, tag, etc.), as discussed above, as well as relevance of the content. The search engine 32 can be configured to deliver a selected relevant item of content to the searching content consumer computer 14 in the form of, for example, a webpage containing the item content.

The content distribution system 10 can further include one or more other service engines 34 configured to allow content consumer users to discover and obtain content from the content data store 26.

The content distribution system 10 further includes an analytics engine 36. The analytics engine 36 is configured to receive content engagement information from the content distribution engine 30, search engine 32, and any other service engines 34. Content engagement information can include indications of whether content was viewed, who viewed the content, a duration of time that content was viewed, whether hyperlinks in the content were clicked, and similar.

The content distribution system 10 further includes a transaction data interface 38 configured to receive financial transaction data 40 from one or more external sources. Financial transaction data 40 are representative of various financial exchanges between the content producer and the content consumer. Examples of financial transactions include a content consumer user purchasing stock through a content producer user, a content consumer user exchanging currency through a content producer user, a content consumer user purchasing treasury bonds as brokered by a content producer user, and the like. Financial transaction data 40 is out-of-band with content distribution, in that financial transaction data 40 flows differently from content. Further, financial transaction conditions may or may not be placed on content distribution. It is contemplated that particular content may be distributed on the condition of a future financial transaction. For example, a content producer user may select that a particular item of content is only available to content consumer users willing to purchase a certain value of services through the content producer user. Such an interaction can be considered out-of-band, in that the timing of the distribution of the item of content and the promised financial transaction is different, and the undertaking of the financial transaction may not be strictly enforced. Financial transaction data 40 may be provided by content consumer users, content producer users, or both.

Figure 2:
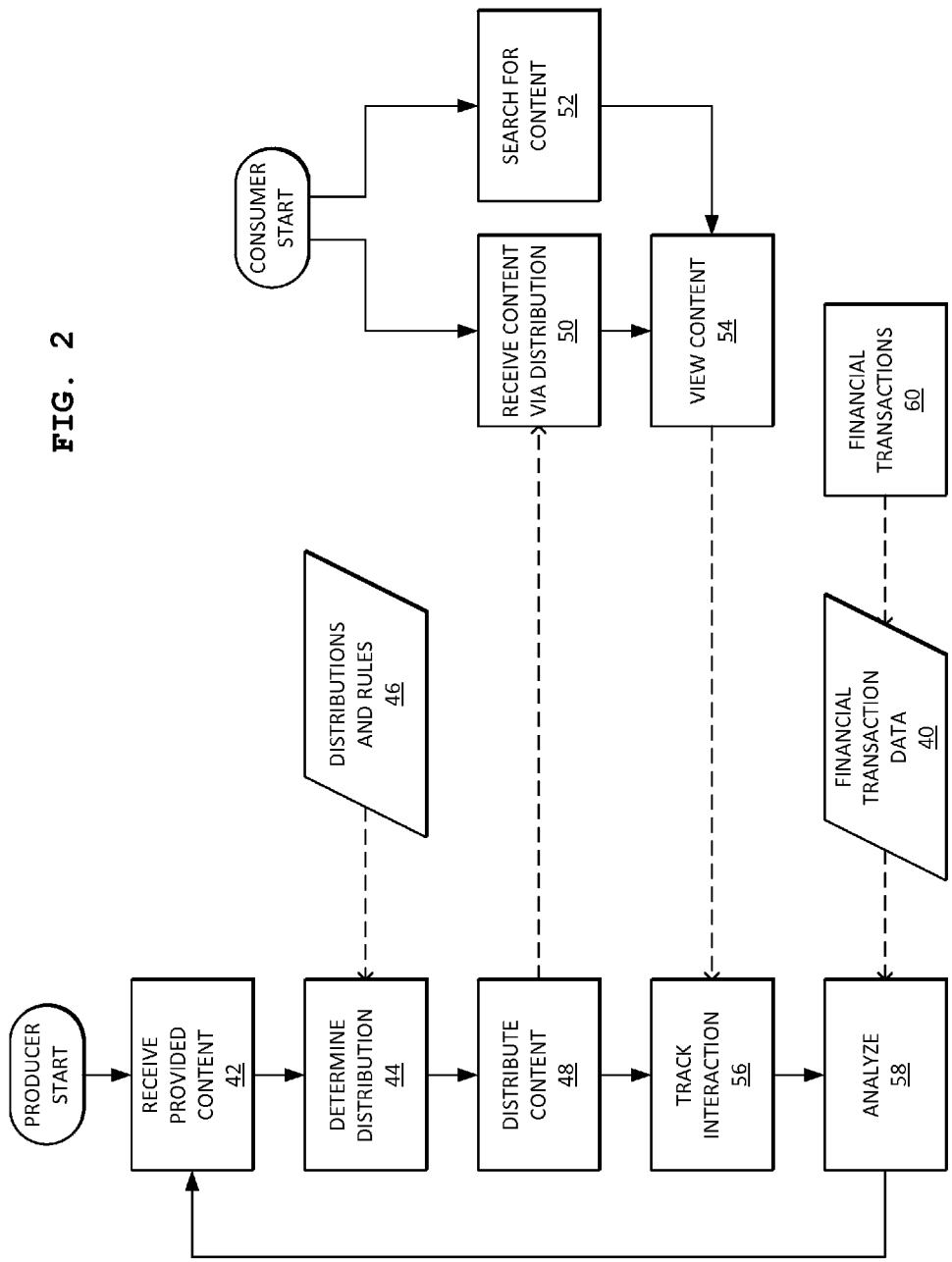
FIG. 2 is a flowchart of a method of distributing content and analyzing content engagement.

FIG. 2 illustrates methods according to the present invention. The methods are shown with illustrative blocks or steps connected by solid lines. Data communication between methods is generally shown in dashed line. The methods of FIG. 2 will be described with reference to the system 10 of FIG. 1, but this is not intended to be limiting and the methods can be used with other systems. The blocks/steps can be performed in sequences other than shown.

At 42, content is provided by content producer users. The content distribution system 10 receives content from various content producer users via content producer computers 12 and the content producer interface 20. Content is stored at the data store 26 until a scheduled time for delivery or until content is requested by content consumer users by, for example, a search.

At 44, distribution for various items of content is determined by the content subscription manager 28. Distributions and rules governing distribution 46 can be referenced. Distributions can be editable by content producer and content consumer users, so that content producer users can add content consumer users to distributions, content consumer users can add themselves to public content distributions, content producer users can remove content consumer users from distributions, and content consumer users can remove themselves from distributions. Rules may be inherent to a list of subscribers for a distribution, having been checked before each subscriber was added, or may be checked or effected on a list of subscribers, at 44. As will be discussed in detail below, rules can be used to ensure compliance with spam and/or securities laws.

Then, at 48, the content distribution engine 30 delivers the content to content consumer computers 14 in accordance with the distributions and any rules 46 maintained by the content subscription manager 28. Content consumer users receive the content at 50. Content consumer users may also use the search engine 32 or other service engine 34 to discover and obtain content, at 52.

The content, whether received via email via a distribution or obtained via search or other method is then presented to the content consumer user, at 54. Content consumer user interaction with the content is tracked, at 56. Tracked interactions can include detecting content opening/viewing, measuring a length of time content is viewed, and the monitoring of clicking of hyperlinks within the content, among others.

Content interaction data is then fed into the analytics engine 36, so that such interactions can be studied by content producer users.

In addition, out-of-band financial transactions may occur, at 60, and relevant financial transaction data 40 from such transactions can be provided to the analytics engine 36, so that the analysis 58 can output correlations between financial transactions 60 and content interaction. Financial transactions 60 can include, without limitation, purchases of various financial products, sales of various financial products, etc. For example, the analysis may show a positive, negative, or neutral correlation between a property of the content (i.e., another, author's firm, title, sector, etc.) and financial transactions 60. The analysis 58 is contemplated to be cumulative over selectable time windows, such that long term correlations can be made. That is, it is expected that, in some cases, several items of content may be distributed before a correlation to a financial transaction may be made.

Analysis 58 can be used by the content producer to provide improved content, at 42, and to modify distribution of such content. As such, the analysis 58 can provide measured and quantified feedback as to the nature and effectiveness of the content being created by content producer users.

The content producer method 42-48, 56-58, the content consumer method 50-54, and the processing of out-of-band financial transactions 60 are asynchronous with respect to each other. That is, actions in a given method are not conditional on actions in another of the methods. To illustrate, content producer users may provide and distribute content 42-48 without any content consumer users viewing such content. Content consumer users may view previously provided content 50-54 without any new content being provided by the content producer. Financial transactions 60 and data 40, which are contemplated to lag content production and consumption, continue regardless of the state of content production and consumption. However, it is worth noting that, despite the asynchronous nature of the methods, each method provides information that is important to at least one other method. For example, the content producer method 42-48, 56-58 provides content to the content consumer method, the content consumer method 50-54 provides content interaction data to the content producer method, and the out-of-band financial transactions 60 provide financial transaction data 40 to the content producer method 42-48, 56-58. So, while the methods operate independently, data is communicated among them.

Content consumer users benefit from the nature of content, as they currently do. Further, content consumer users benefit from a single system 10 that provides a unified content consumer interface 22 through which content consumer users can manage their subscriptions to content and discover new content. For example, a content consumer user can readily use the system 10 to find and subscribe to a newly available newsletter in the content consumer user's sector.

Content producer users benefit from a central system in which to publish and distribute content, as well as analytics of content consumer user engagement with the content. Such analytics can be supplemented by out-of-band financial transaction data 40. Correlations between content consumer user engagement and financial transaction data 40 can reveal to content producer users how their content is being acted upon by their clients and potential clients. For instance, it may be discovered that a particular content producer user generates highly engaging content, but the relevant financial transaction data 40 may indicate that such user does not receive their share of financial transactions 60 through the engaged content consumer users. This can be acted upon by the content producer user, or their manager, by changing which content consumer users receive the content or by changing the content itself.

Figure 3:
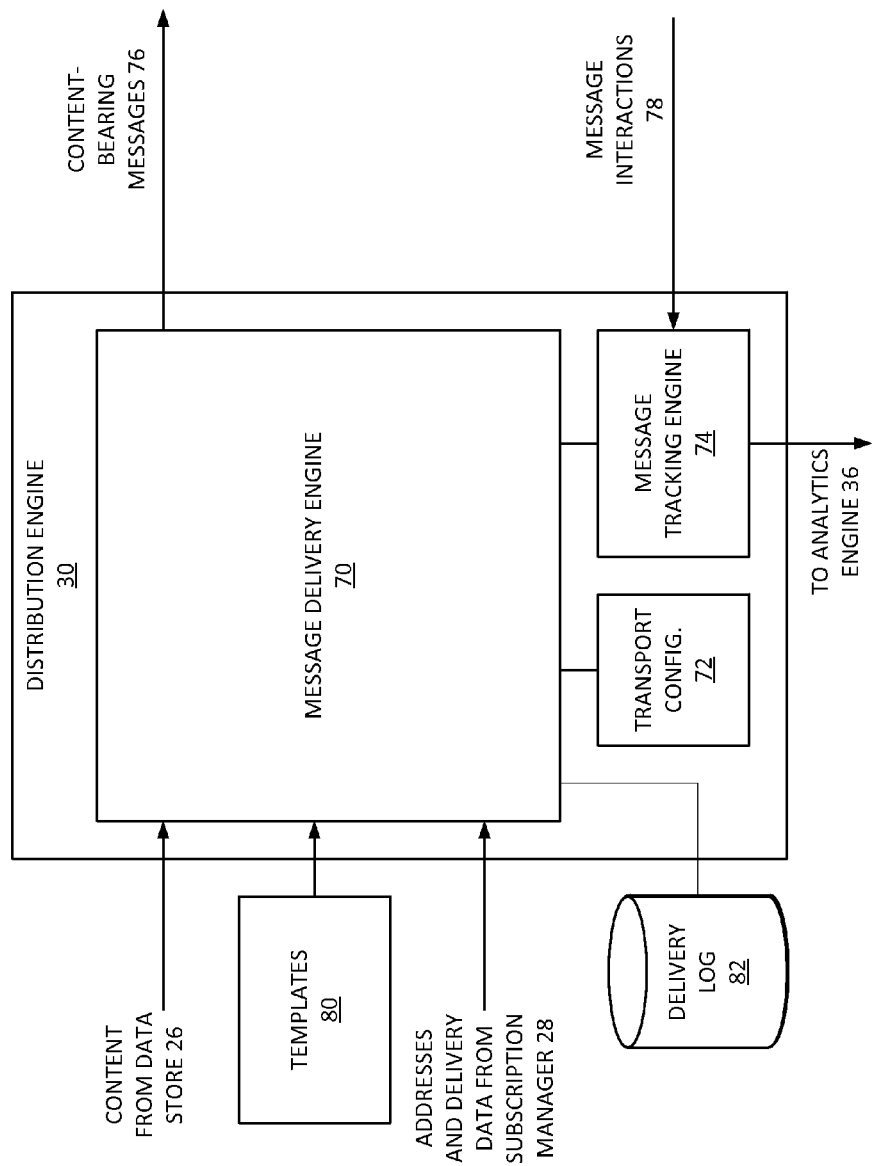
FIG. 3 is a block diagram of a distribution engine.

With reference to FIG. 3, the content distribution engine 30 includes a message delivery engine 70, a transport configuration 72, and a message tracking engine 74. FIG. 3 is schematic and illustrative, and functionality described for various blocks may be split into smaller blocks or combined into larger blocks. Connections between blocks are representative of information communication, with arrows illustrating the generally contemplated flow of information. Blocks, connections, and arrows are not to be taken as limiting.

The message delivery engine 70 is provided with content from the data store 26 and is configured to insert the content into content-bearing messages 76 destined for content consumer users. In this embodiment, the message delivery engine 70 includes a simple mail transfer protocol (SMTP) mailer program or the like. Content-bearing messages 76 may be HTML-encoded email messages into which content is inserted within an HTML element, such as a DIV element. The message delivery engine 70 can be configured to handle scheduling, bounces/retries, undeliverable notifications, and other sundry aspects of email message delivery.

The message delivery engine 70 can also be configured to pre-process hyperlinks contained within content, so that hyperlinks targeting content outside the content distribution system 10 are rewritten to targets within the system 10 for tracking purposes. In an example of such a technique, a hyperlink originally in the content can be provided as a uniform resource locator (URL) parameter of a rewritten hyperlink. That is, a hyperlink to "www.example.com/article.htm" within the content can be rewritten as "www.contentdistributionsystem10.com/redirector?target=www.example.com/article.htm&tracking_code=91008457", so that a redirector within the system 10 can monitor link tracking codes, and thus monitor clicks of hyperlinks within the content, before redirecting the user agent to the original URL ("www.example.com/article.htm"). Other techniques for tracking hyperlink selections can be used, as will be apparent to those of skill in the art.

The message delivery engine 70 is also provided with addresses from the subscription manager 28. Addresses include one or more destination addresses for a particular content-bearing message 76, and may also include copy addresses, blind copy addresses, and reply-to addresses. In the example of email, a list of destination email addresses, which belong to content consumer users who have subscribed to particular content, may be provided to the message delivery engine 70 by the subscription manager 28. The subscription manager 28 may also provide a reply-to email address, so that the receiving content consumer users can respond directly to the content producer user originating the message rather than replying to the message delivery engine 70. The subscription manager 28 may further provide other delivery data such as whether or how a particular message 76 is to be tracked and whether or how delivery of a particular message is to be logged.

The transport configuration 72 is a file or other data structure that stores configuration data, such as the protocol (e.g., SMTP) and settings with which to send the content-bearing messages 76. The transport configuration 72 may also be configured to insert tracking information into messages 76, such as tracking images and hyperlink tracking codes.

The message tracking engine 74 monitors content consumer user interactions 78 with the content-bearing messages 76 after the messages 76 are delivered. Various interactions can be monitored. The message tracking engine 74 can be configured to track the loading of a tracking image inserted into a message 76 to determine whether the message 76 has been opened or viewed, as well as which Internet protocol (IP) address requested the image. The tracking engine 74 can be configured to query an image server to obtain this information about the image. The image server can be configured to throttle a rate of delivery of the tracking image (e.g., 1 bit per second), so that the message tracking engine 74 can determine message viewing duration by querying the image server to obtain the image delivery status (i.e., number of bits delivered). The more bits of the tracking image delivered, the longer the message has been viewed. Different tracking images can be used to track message opening and message viewing duration. The message tracking engine 74 can also be configured to monitor clicking of hyperlinks within messages 76, which can be achieved by the rewriting and redirecting technique discussed above. Output of the message tracking engine 74 is made available to the analytics engine 36 as content interaction data and such data may be date- or time-stamped by the message tracking engine 74.

It is also contemplated that message interactions 78 can include explicit feedback from content consumers. Specifically, messages 76 can include interactive buttons (activating a suitable hypertext tracking link when clicked by a user) or similar features, which the user is asked to click or otherwise interact with if they found the content of the respective message 76 to be useful or of interest. Further, message interaction 78 can comprise a reply email, etc.

Output of the message tracking engine 74 can also be used to update relevance values of the content.

The message delivery engine 70 can also be configured to reference templates 80 when generating content-bearing messages. Templates 80 can be provide in HTML and can contain general information about a content producer firm (e.g., name, logo, letterhead, address, etc.), or specific information of the content producer user (e.g., name, branch office, sector, etc.), sending a particular content-bearing message 76. Templates 80 can be shared among multiple content producer users belonging to a content producer firm. Accordingly, templates 80 can provide a consistent appearance to content-bearing messages 76 despite such messages being sent by different content producer users and containing different content.

The message delivery engine 70 can also be configured to write to a delivery log 82 to maintain a history of messages sent for compliance with relevant laws, such as anti-spam laws and securities trading laws. An example log entry includes delivery timestamp, sender email address, name or email address or other identifier of the distribution, recipient email address, and message subject.

Figure 4:
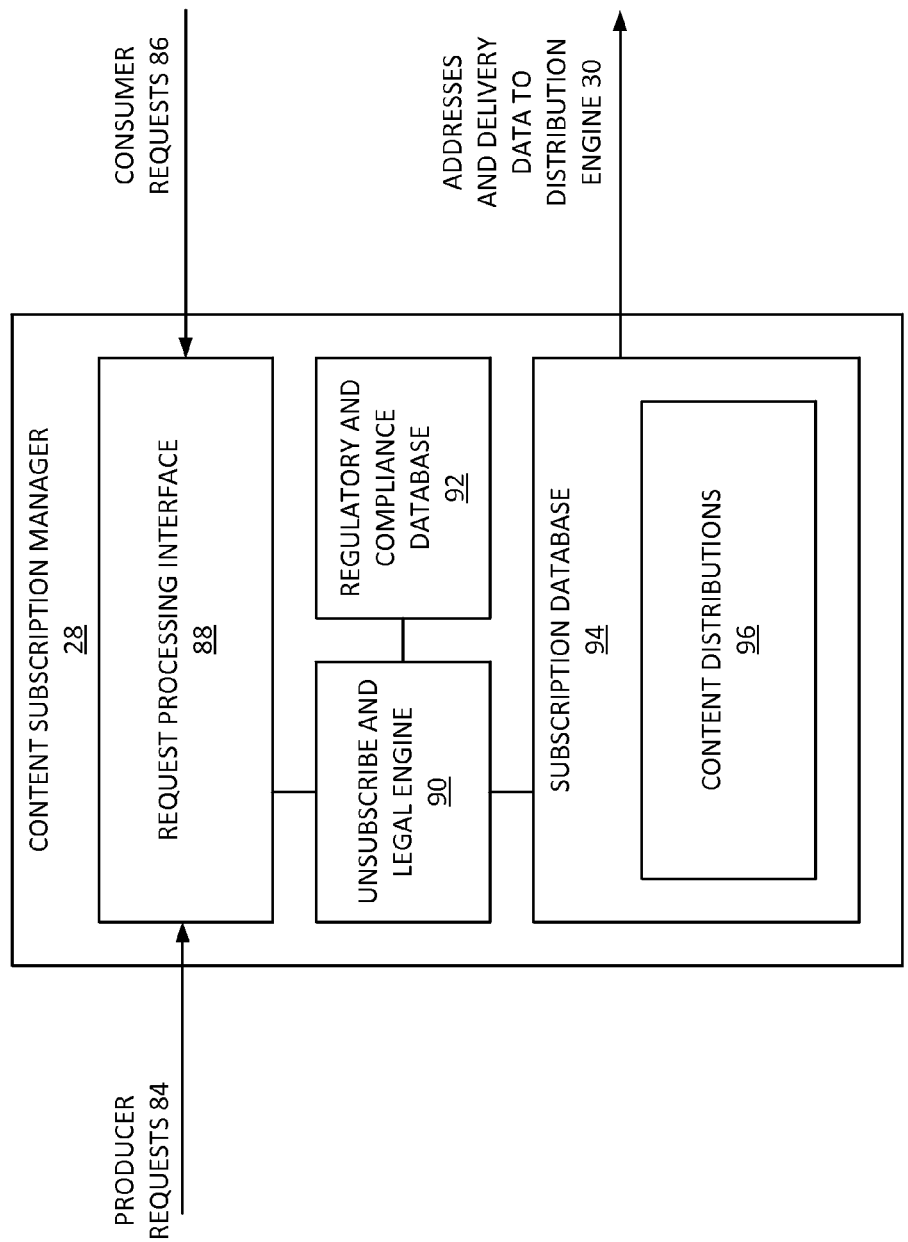
FIG. 4 is a block diagram of a content subscription manager.

FIG. 4 shows the content subscription manager 28. FIG. 4 is schematic and illustrative, and functionality described for various blocks may be split into smaller blocks or combined into larger blocks. Connections between blocks are representative of information communication, with arrows illustrating the generally contemplated flow of information. Blocks, connections, and arrows are not to be taken as limiting.

The subscription manager 28 is configured to process content producer requests 84 and content consumer requests 86 to add, remove, or modify content subscriptions for various users and distributions. For instance, a content producer request 84 may request that a particular content consumer user be added to a particular content distribution. A content consumer request 86 may similarly request that the requesting content consumer user be added to a content distribution. Requests 84, 86 may also be configured to remove content consumer users from content distribution or change how content consumer users are to receive content (e.g., change frequency of delivery, time of delivery, mailbox to receive deliveries, etc.).

The content subscription manager 28 includes a request processing interface 88. The request processing interface 88 handles incoming requests 84, 86 by passing requests to an unsubscribe and legal engine 90 and providing responses to requesting users. The request processing interface 88 can include one or more webpage forms available via the content producer and content consumer interfaces 20, 22 (FIG. 1).

Incoming requests are processed by the unsubscribe and legal engine 90 with reference to a regulatory and compliance database 92. The unsubscribe and legal engine 90 is configured to process content consumer requests 86 to unsubscribe from particular content. Such unsubscribe requests may arrive via an unsubscribe button at the request processing interface or via a hyperlink within a content-bearing message.

The unsubscribe and legal engine 90 is further configured to deny requests 84, 86 that violate rules established in the regulatory and compliance database 92. For example, a content producer user may require explicit permission from a content consumer user to add the content consumer user to a content distribution. The regulatory and compliance database 92 may further include rules for logging delivery of content-bearing messages sent to particular users. The regulatory and compliance database 92 may further include rules for tracking message interactions, so that the message delivery engine 70 can include or exclude tracking codes/images accordingly. The regulatory and compliance database 92 may further include rules governing insider trading or other securities trading concerns, so as to deny requests 84, 86 that may violate securities laws. Generally, the unsubscribe and legal engine 90 and using a regulatory and compliance database 92 are configured to ensure that content distribution meets legal requirements.

Content consumer and content producer users may have their legal jurisdiction (e.g., country of residence) stored in the user database 24 (FIG. 1), and the unsubscribe and legal engine 90 can be configured to reference the jurisdiction of a user when interacting with the regulatory and compliance database 92 and determining whether a request 84, 86 will be denied or allowed.

The request processing interface 88 can also be configured to allow users to approve pending request from other users. For example, a particular distribution may be private, in that only approved or invited content consumer users are allowed to subscribe. Accordingly, the request processing interface 88 can provide a web form for a content consumer user to request a subscription and provide a web form for the associated content producer user to approve or deny the subscription request. Similarly, privacy legislation in a content consumer user's country of residence may require explicit opt-in to email communications. Hence, the request processing interface 88 can provide a web form for a content producer user to request content delivery to a content consumer user and provide a web form for the content consumer user to approve or deny content delivery.

The content subscription manager 28 includes a subscription database 94 that stores subscription information, which may take the form of content distributions 96. Content distributions 96 can contain an association of content producer content to content consumer users, so that particular content can be delivered to the subscribing content consumer users. Content producer content may be indicated by a content producer user ID or by distribution ID. In the former case, content consumer users subscribe to all content form a particular content producer user. In the latter case, content producer users subscribe to particular content, such as a particular morning note. The latter may be preferable when a content producer user produces different types of content or operates in different sectors. The content distributions 96 may contain or be associated with delivery data indicative of whether content-bearing messages should be logged and tracked.

Figure 5:
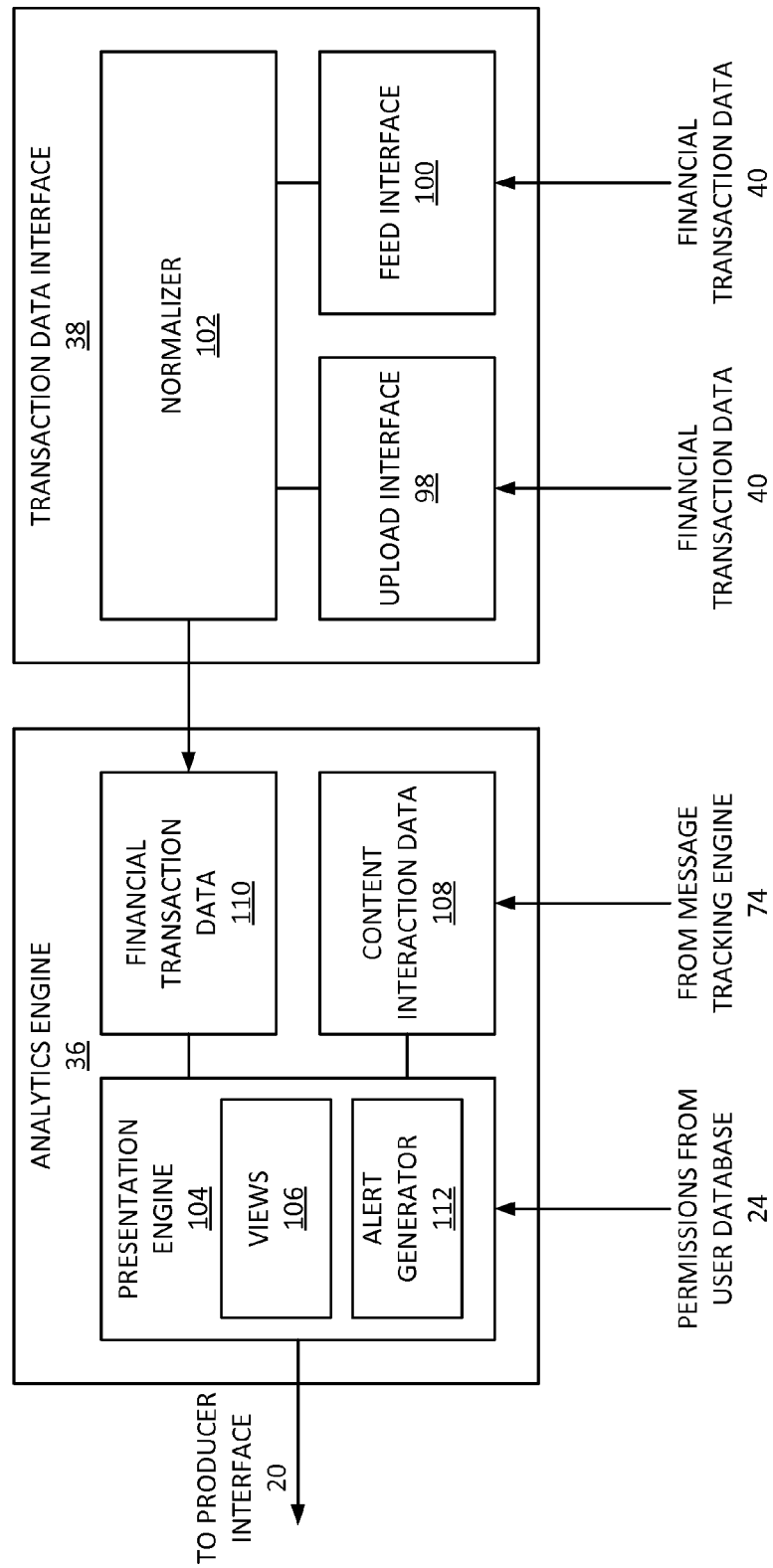
FIG. 5 is a block diagram of an analytics engine and a transaction data interface.

FIG. 5 illustrates the analytics engine 36 and the transaction data interface 38. FIG. 5 is schematic and illustrative, and functionality described for various blocks may be split into smaller blocks or combined into larger blocks. Connections between blocks are representative of information communication, with arrows illustrating the generally contemplated flow of information. Blocks, connections, and arrows are not to be taken as limiting.

The transaction data interface 38 is configured to receive financial transaction data 40 and provide such to the analytics engine 36. Accordingly, the transaction data interface 38 can include various interfaces for receiving financial transaction data 40, such as an upload interface 98 and a feed interface 100.

The upload interface 98 is configured to allow content producer or content consumer users to upload financial transaction data 40 in the form of data files, such as spreadsheets, comma-separated text files, and the like. The upload interface 98 can include a web form configured to allow selection and uploading of such a file. The upload interface 98 can be provided as an application programming interface (API).

The feed interface 100 is configured to connect to feeds of financial transaction data 40, which may output data in real time, near real time, or delayed real time. The feed interface 100 can be provided as an API.

The transaction data interface 38 can further include a normalizer 102 configured to normalize potentially dissimilar formats of the financial transaction data 40 into a common format for use by the analytics engine 36. The normalizer 102 may also be configured to associate financial transaction data 40 with particular firms, users, products, sectors, or other data at the time financial transaction data 40 is provided, in case financial transaction data 40 does not inherently contain such associations.

The analytics engine 36 can include a presentation engine 104 defining a number of views 106. The views 106 can be configured output numerical charts, graphs, and other presentation elements to allow content producer users at the content producer interface 20 to analyze the content interaction data 108 received from the message tracking engine 74 and financial transaction data 110 received from the transaction data interface 38. Content interaction data 108 and financial transaction data 110 may be stored indefinitely to permit historical analysis. It is contemplated that financial transaction data 40 will typically include time- or date-stamps. The content interaction data 108 can be received as time- or date-stamped from the message tracking engine 74, as discussed above, to permit temporal correlation with the financial transaction data 110. The analytics engine 36 can include a commercially available program or service, such as Google Analytics.

The views 106 can be configured to present indications of content consumer user engagement represented by the content interaction data 108 in conjunction with financial transaction data 110 for the same content consumer users. This can allow content producer users to discover and understand any correlations, or lack thereof, between the content that they produce and actual realized financial benefits from such content. For instance, content may include a morning note for a particular industry and a view 106 may be configured to output a number of content consumer subscribers for the morning note, the average open rate of the morning note by the subscribers, and the average value of trades made by the subscribers with the content producer party who generated the morning note. This can allow the content producer user to understand how to adjust the content of the morning note and how to better target the content consumer users who receive it, so as to increase financial gain from the morning note. Higher-level views 106 may allow managers and higher-level individuals within a firm to understand how individual content producer users are performing as well as understand how the firm is performing in various sectors and with respect to various content consumer parties.

The views 106 can be configured to present different sets of information to different users. A content producer user who distributes particular content can be limited to views relevant only to that content. A content producer user who manages subordinate content producer users at the same firm can have access to all information associated with content handled by the subordinate content producer users. Further, other views can be configured to provide firm-wide information indexed by location, manager, sector, and the like, with such views being accessible to a director or officer of the firm.

Permissions to access various views 106 can be based on information contained in the user database 24. For example, one or more fields of the user database 24 can be dedicated to identify which views are available to a given user.

The presentation engine 104 can also include an alert generator 112 configured to periodically check whether data triggers a specified condition. Any condition supported by the content interaction data 108, financial transaction data 110, and user data can be used. Alerts can be formed into automatic email messages destined for content producer users, and as such may call on the message delivery engine 70. Alerts may be configured to contain the triggering condition or data, as well as information about content consumer users that contributed to the triggering. Alerts may be referred to as passive analytics, in that content producer users need only set them up initially and can then rely on being automatically alerted to actionable developments.

FIG. 6 shows a data structure for use with the present invention. The data structure is merely an example and is not intended to be limiting.

As shown, a table of users 120 may include data such as unique user ID, email address, real name, unit (e.g., division within a firm, geographic location, etc.), role ID, firm ID, an indication as to whether the user operates as a content consumer user or content producer user, and the country or legal jurisdiction in which the user is located.

A table of roles 122 can store data such as role ID, role title, and permissions associated with such role. Roles 122 may be associated with users 120 by role ID, so that each user can have one role. Example titles include analyst, agent, researcher, trader, manager, director, officer, and the like.

A table of firms 124 can store data such as firm ID, firm name, address, telephone number, and indications of templates. Firms 124 can be associated with users 120 by firm ID, such that each user can belong to one firm.

Users 120, roles 122, and firms 124 can act collectively as the user database 24 (FIG. 1).

A table of distributions 130 can include data such as distribution ID, author ID, distribution title, description, financial product (e.g., equity, bond, etc.), sector (e.g., mining and minerals, energy, technology, etc.), tags, and an indication as to whether the distribution is private and subscription requests require approval of the author. Distributions 130 can be associated with users by author ID, such that each distribution has one user as its author.

A table of subscriptions 132 can store subscription ID, subscriber ID, and distribution ID. Subscriptions 132 link users 120 via subscriber ID to distributions via distribution ID, such that various users can subscribe to various distributions. Subscriptions 132 can also specify financial consideration and delay, as will be discussed further below. It should be noted that the system 10 does not require user 120 information to receive content distributions, as such distributions are carried out with the message delivery engine 70, which is this embodiment generates and sends email messages. Hence, only an email address is required to add a subscriber to a distribution. Accordingly, subscriptions 132 can be configured to store email addresses for subscribers that are not registered users 120.

Distributions 130 and subscriptions 132 can act collectively as the content distributions 96 (FIG. 5).

Content interaction data 108 can be stored in association with subscriber/user ID and distribution ID. Hence, any information about a user who interacted with content can be obtained.

It is contemplated that financial transaction data 110 can be stored in association with firms 124. This may occur when financial transaction data 110 is provided out-of-band by a particular firm. Financial transaction data 110 may alternatively or additionally be associated with users 120 or distributions 130. For example, financial transaction data 110 may represent trades conducted through an individual content producer user, in a particular sector, for a particular product. Such associations are shown in dashed line, as they may not always be available.

Analytics and views thereof 140 can pull financial transaction data 110, interaction data 108, and any associated data of users 120, roles 122, firms 124, distributions 130, and subscriptions 132 to form a comprehensive picture of user content engagement. For example, as financial transaction data 110 is expected to be associated with firm 124, then a general assessment of the engagement of a firm's content by the content consumer can be made using the interaction data 108 for the firm's distributions 130. When financial transaction data 110 indicates the name of a user 120, then an assessment can be made of the level of content consumer engagement with the content provided by the user, by the user's unit, or other available data associated with the user. When financial transaction data 110 indicates sector or product data, then an assessment can be made of the level of content consumer engagement with the particular type of content. Other examples of assessments, drill-downs, and data slicing are also contemplated, with the above merely being examples. Further, the identity of the content consumer can be refined via subscriber ID, such that assessments can be made for any available property of content consumer subscribers (e.g., content consumer firms, units, sectors, etc.).

As mentioned elsewhere herein, analytics and views 140 can be limited by permissions defined by roles 122 (e.g., manager, director, etc.), such that certain roles can view certain analytics.

Any kind of analytics supported by the data can be provided. Passive analytics include information that may be representative of changes in past content engagement patterns. In one example, a passive analytic is defined as a number of distinct content consumer users who opened a particular item of content within one hour after it was distributed. In another example, another passive analytic is defined as an 80% view rate for an item of content. In still another example, another passive analytic is defined as a 20% increase in view rate for an item of content when compared to a baseline average. Passive analytics can be sent as alert messages to authors of content if and when the measured condition is triggered. In some examples, such a message can include the contact information for a number of content consumer viewers.

FIG. 7 shows a method for triggering alert messages based on passive analytics. The method may be performed by the alert generator 112 of the analytics engine 36 (FIG. 5). At 150, for particular triggering condition (e.g., number of views within a certain time, number of views by content consumer users at a certain firm, etc.), data related to a triggering condition is obtained from the various data shown in FIG. 6. Next, at 152, it is determined whether the data triggers the condition. If the condition is not triggered, then the next condition is evaluated, at 154. If the condition is triggered, then an alert message is sent to the content producer user who set up the condition, at 156, before the next condition is evaluated. FIG. 8 shows an example of a passive analytic message in the form of a call list.

With reference again to FIG. 6, subscriptions to content distributions can be bound by financial consideration. For example, a content producer user may require that a certain value of trading be handed as a condition for a particular content consumer user being provided with a subscription. Alternatively, a content producer user who generates content may outright charge content consumer users for subscriptions. This may also be useful for third-party content providers, such as researchers, academics, and the like, who are not directly associated with financial transaction data but who access the content producer interface 20 to provide content and track its distribution, as discussed herein for content producer users. Thus, subscriptions 132 can include further data as to the nature of and value of financial consideration requested by the content producer or third-party user providing the content.

In addition or alternatively to financial consideration for subscriptions, subscriptions 132 may be subject to delay. That is, each subscription 132 can store a delay (e.g., in days, hours, etc.) that must elapse before the content distribution is provided to the subscriber. That way, a content producer content creator may offer a free but delayed subscription to any content consumer user, but may require financial consideration for non-delayed content. Other scenarios are also contemplated.

Still with reference to FIG. 6, a third party user 120 may also be associated with one or more content producer firms 124, such that commissions earned by such firms from content consumer subscribers of the third party's content may be split with the third party. This can be achieved by a particular role 122 for a user 120 associated with a firm 124.

Financial transaction data 110 associated with the firm 124 and name of the third party or the product/sector of the third party's content can be used as a basis to calculate commission split. Calculation of commission splits can be performed by the system 10 or outside the system 10. Further associations between content producer firms and third party users 120 are contemplated.

Figure 9:
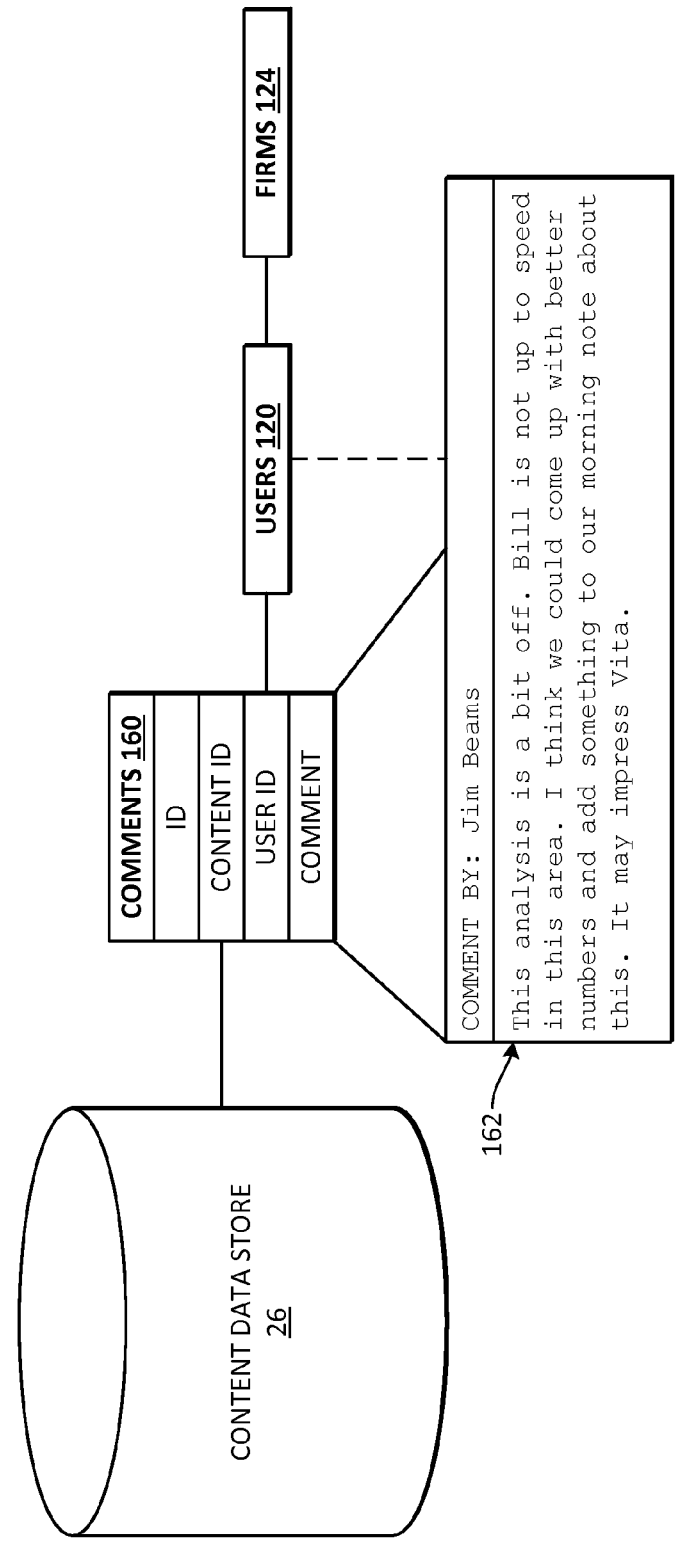
FIG. 9 is a schematic diagram of a comment system for the content distribution system.

As shown in FIG. 9, the content distribution system 10 can further include a comment system. A table or database of comments 160 can store unique comment IDs in association with content IDs that uniquely identify items of content in the content data store 26, user IDs of commenting users 120, and comment text, which is entered by a comment interface 162. Comments can be limited to viewing by users 120 associated with the same firm 124 as the commenting user. The comment system can be configured to support replies and threading.

Figure 10:
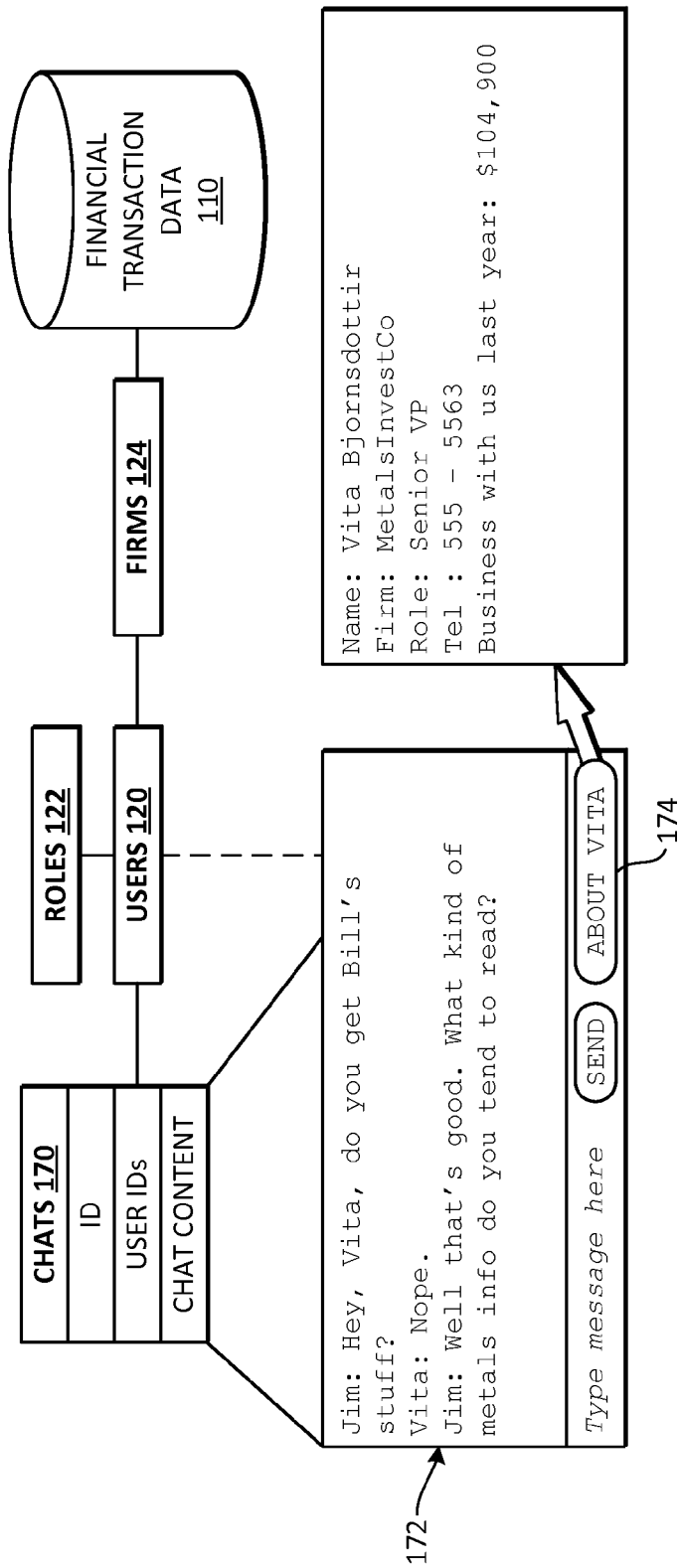
FIG. 10 is a schematic diagram of a chat system for the content distribution system.

As shown in FIG. 10, the content distribution system 10 can further include a real-time chat system. A table or database of chats 170 can store unique chat IDs in association with user IDs of users 120 involved in the chat 170, as well as chat content, which can be updated by participating users at a chat interface 172. Chats can be triggered by users at their respective interfaces 20, 22, and can be triggered with other users who are currently logged into the system 10. The chat interface can include a button 174 that triggers display of information another chat participant, such information from the participant's role 122, firm 124, as well as financial transaction data 110. Alternatively or additionally, the chat interface 172 can be styled (e.g., color, font, size, etc.) based on such information about the other participant. The chat system may reference and be constrained by the unsubscribe and legal engine 90 and the regulatory and compliance database 92, in that certain users may wish to disable the chat system, may wish to block individual or types of users, or may be subject to securities laws that limit or prohibit certain communications with certain individuals.

Figure 11:
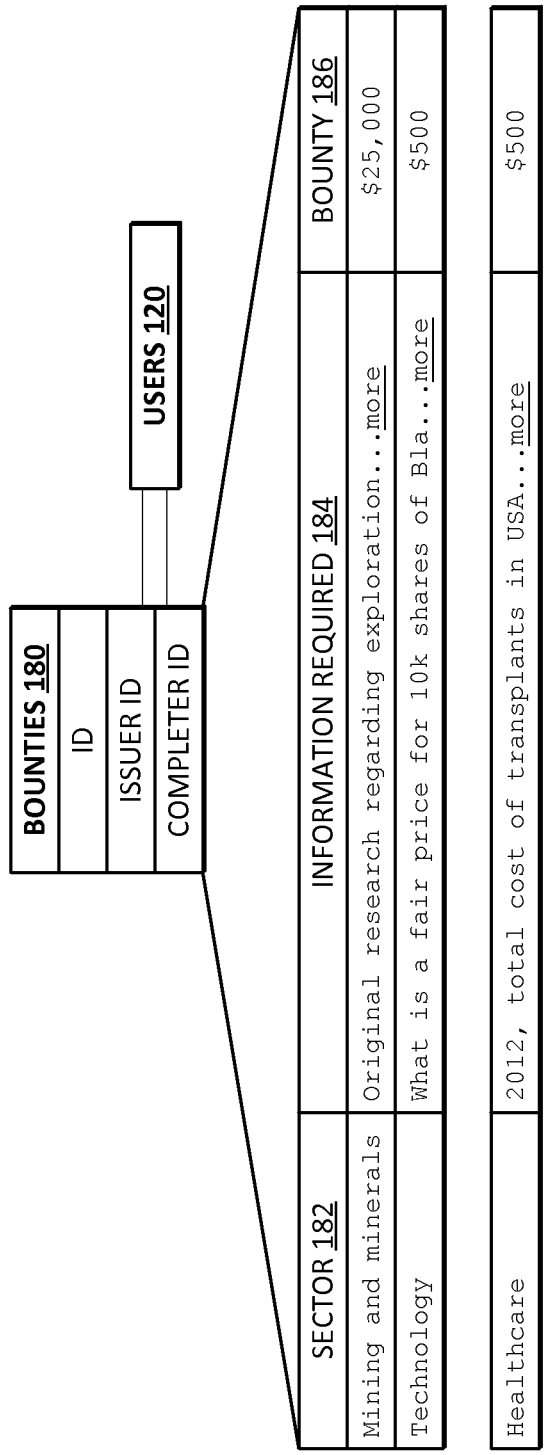
FIG. 11 is a schematic diagram of an information bounty system for the content distribution system.

As shown in FIG. 11, the content distribution system 10 can further include an information bounty system. A table or database of bounties 180 can store unique bounty ID is association with an issuer ID and a completer ID, each of which is a user ID of the user 120 who posted the bounty and the user 120 who successfully completed the bounty, respectfully. Bounties 180 further store sector or product information 182, a description of the information required 184, and a bounty amount 186. It is contemplated that the bounty amount can be a specified commission amount over a specified time, a specified trade value over a specified time, a cash value, or similar. A bounty system user interface can be provided to allow posting of information bounties, locking of bounties being worked on, as well as submission of the information required by a user attempting to complete the bounty to the user who issued the bounty. It is contemplated that bounties can be issued for content that is to be provided as a subscription, so that completion of a bounty takes the form of a new content distribution offered by the completing user to which the bounty issuer becomes a subscriber. In addition, the results of one-off information bounties may be stored in the content data store 26 for future access by other users.

FIGS. 12*a*-12*i* show examples of views that can be used at the content consumer interface 20 and the content producer interface 22. The views can be rendered in a user agent, such as a web browser, of the content producer computers 12 and the content consumer computers 14, and can allow for input or data and commands from the computers 12, 14 to the interfaces 20, 22. FIGS. 12*a*-12*i* are not intended to be limiting and not all aspects of the present invention are shown.

FIG. 12*a* shows a list of distributions 200 for a particular content producer user. The list of distributions 200 provides information about each distribution, such as name, description, author/owner email address, open rate 202, and number of subscribers 204. The number of subscribers 204 indicates the number of content consumer users that received the distribution. The open rate is a measured element of interaction data 108, discussed above, expressed as a percentage and may represent an average over multiple editions of a newsletter or other content distribution. Hence, a content producer user can quickly view how many and what proportion of content consumer users receive and open content bearing messages for various distributions.

Further provided are distribution management buttons or hyperlinks 205 that can be selected to add subscribers to distributions. A search input field 206 is also provided to allow searching or filtering the list of distributions 200. A new distribution button or hyperlink 207 is provided to create a new distribution. A chat interface 208 may be provided in a minimized state and responsive to a selection to start a chat with an operator of the system or another logged-on user, using, for example, the techniques described above with respect to FIG. 10. Further provided is a menu of buttons or hyperlinks 209 for navigation among the views of FIGS. 12*a*-12*i*.

Figure 12B:
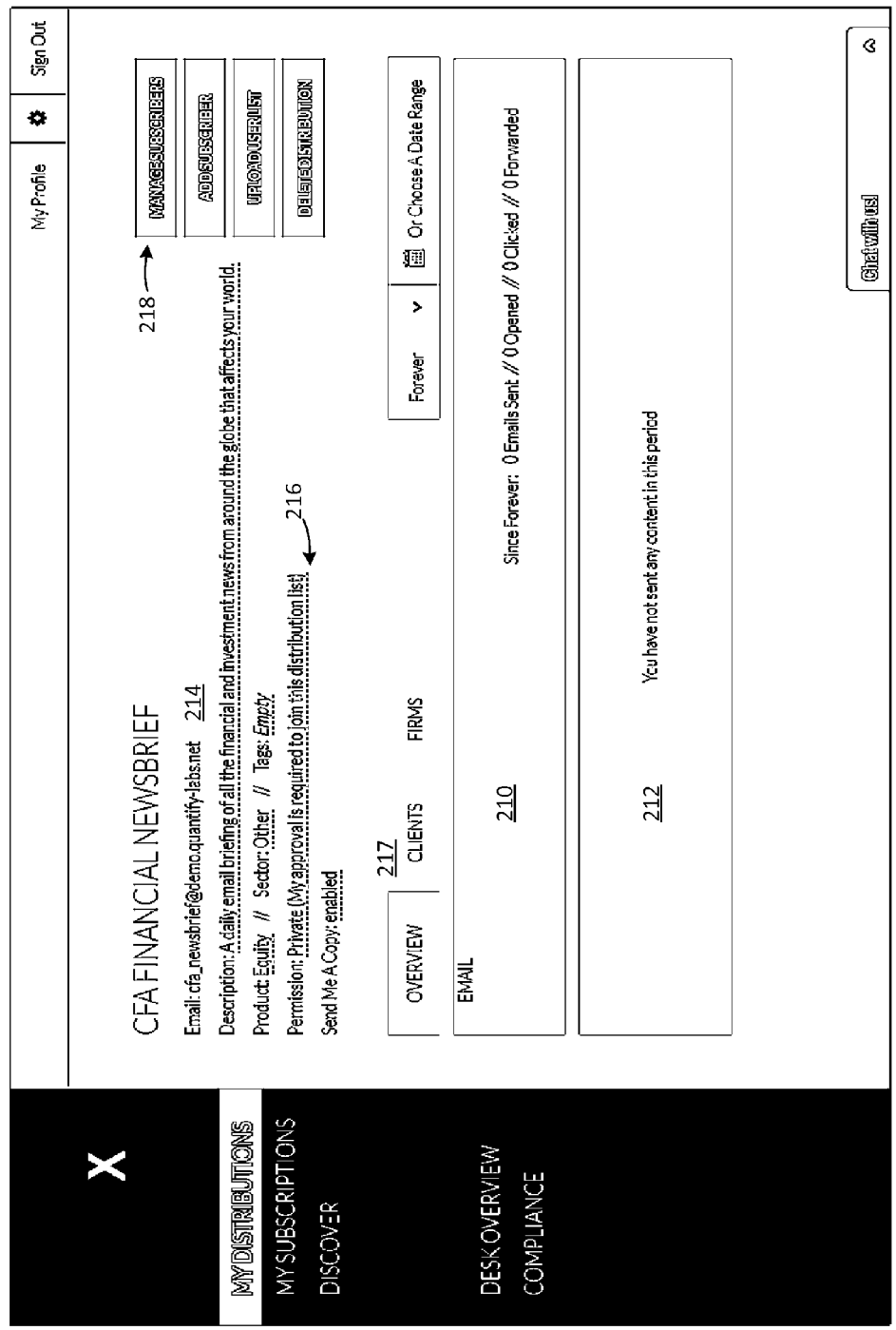

FIG. 12*b* shows a view containing details about a distribution. This view can be arrived at by selecting a distribution in the list 200 of FIG. 12*a*. Show are a list of sent messages 210, sent content 212 of the messages 210, details 214 about the distribution (e.g., author/owner email address, description, product, sector, and tags), as well as option buttons 216 or hyperlinks configured to allow settings to be changed. Options can include copying the author/owner on content-bearing messages and a setting to toggle the distribution between private (e.g., by-invitation or approval required) and public (i.e., open to any registered user). Messages and content can be filtered via selectable tabs 217 specifying overview, clients, and firms, as well as by date. Further, various management buttons or hyperlinks 218 can be provided to edit a list of subscribers, add/remove subscribers, upload a list of subscribers to add, import subscribers from email program (e.g., Outlook), and delete the distribution.

Figure 12C:
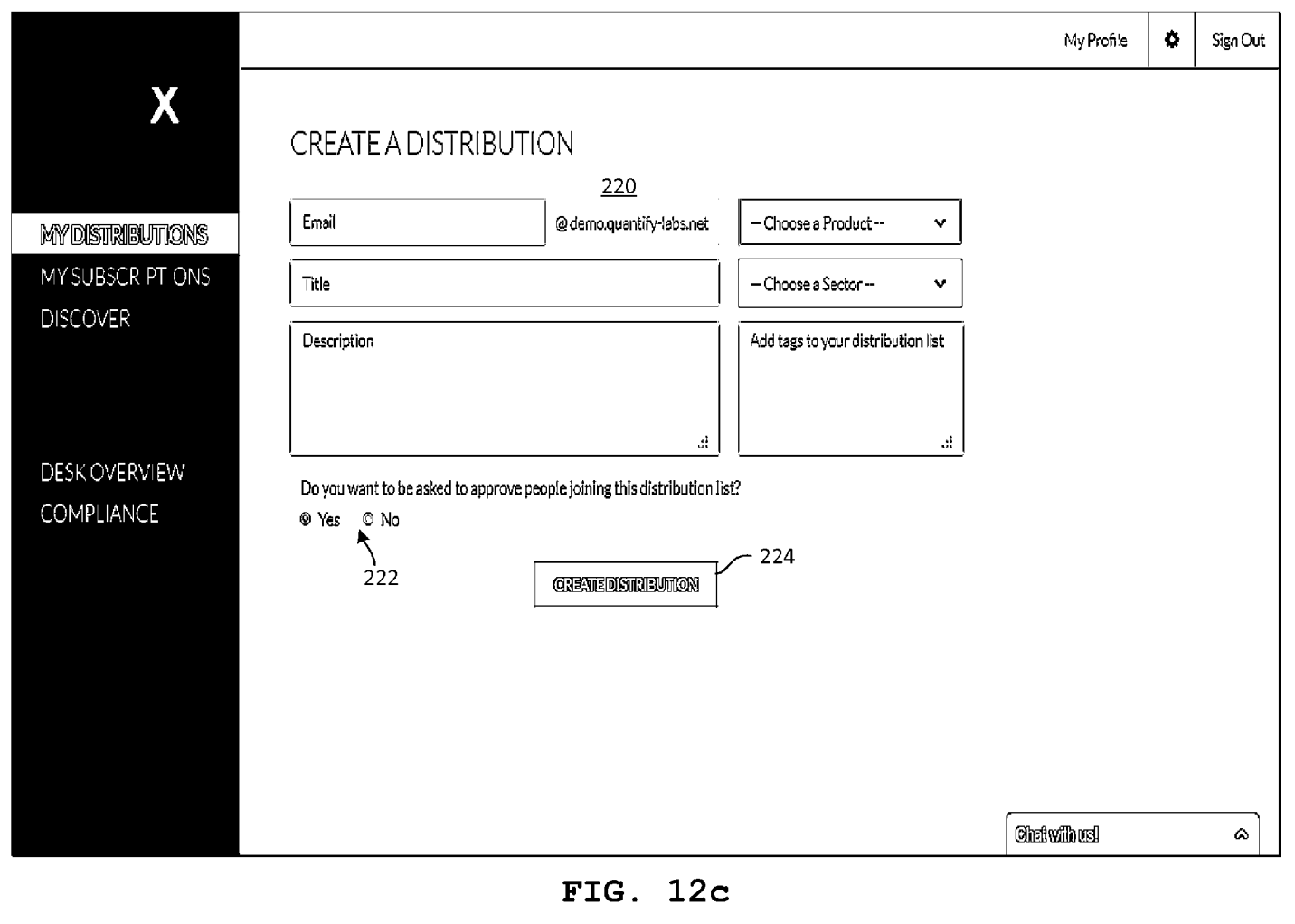

FIG. 12*c* shows a view containing fields configured to receive input for creating a new distribution. This view can be arrived at by selecting the new distribution button or hyperlink 207 of FIG. 12*a*. Included in this view are input fields 220 configured to receive information about the distribution, such as author/owner email address, product, sector, title, description, and tags. Also included are an option 222 to make the distribution private or public and a create button or hyperlink 224 to finalize creation of the distribution.

FIG. 12*d* shows a view containing a list of subscribers for a distribution. This view can be arrived at by selecting a management button or hyperlink 218 of FIG. 12*b*. The subscriber list 230 can be configured to allow for displaying and editing of subscriber information for the particular distribution. Removal buttons or hyperlinks 234 can be provided for each element of the list to facilitate removal of subscribers from the distribution. Various management buttons or hyperlinks 232 can be provide to modify the subscriber list 230.

Figure 12E:
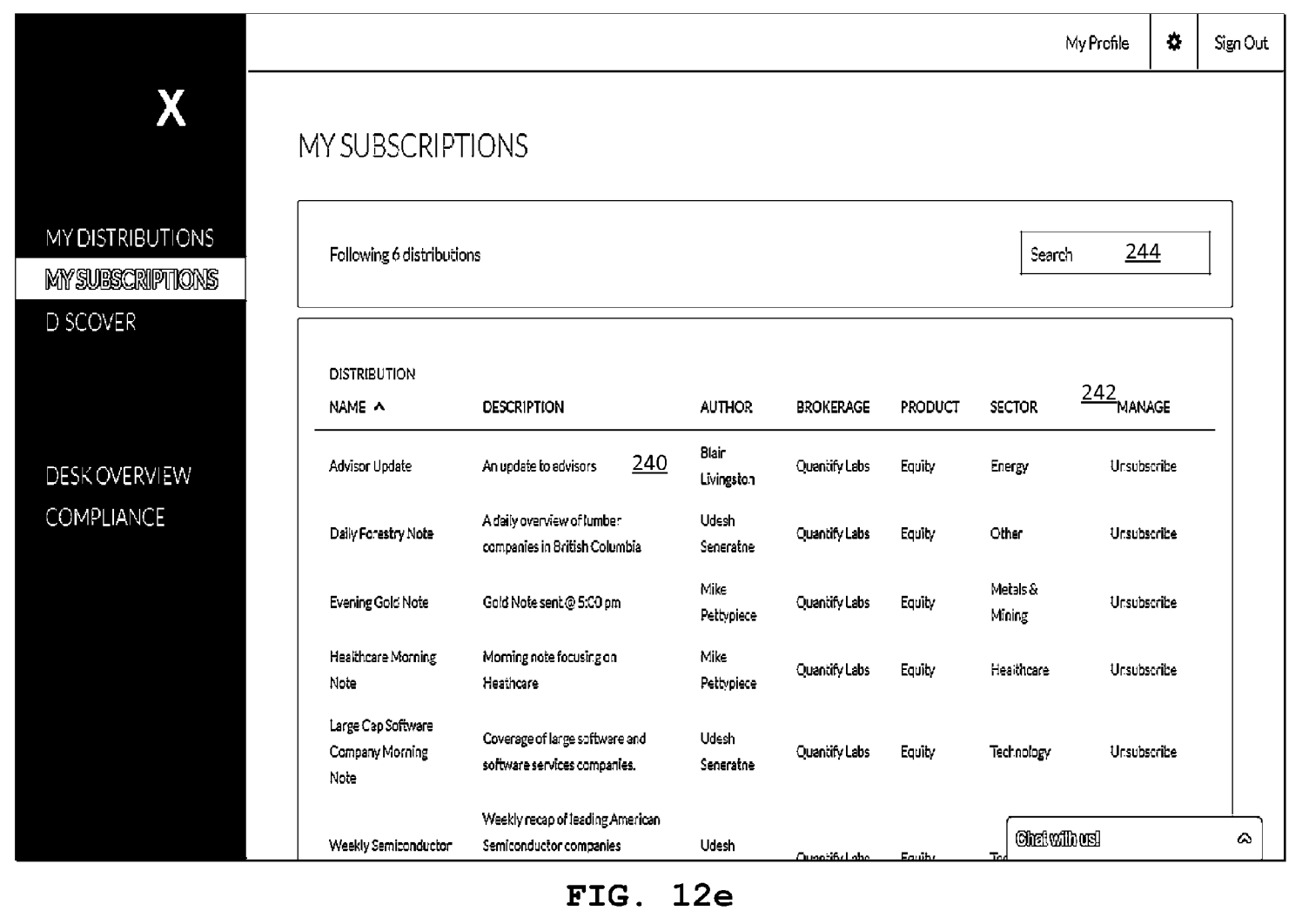

FIG. 12e shows a view of a list of subscribed distributions 240 for a particular content consumer user. The list can include pertinent details of the distributions, such as name, description, author, brokerage, product, and sector and can provide unsubscribe buttons or hyperlinks 242 to allow the content consumer user to unsubscribe from distributions. A search input field 244 can also be provided to allow searching or filtering the list of subscribed distributions 240.

FIG. 12f shows a content discovery interface configured to allow content consumer users to search, filter, browse, and sort new distributions to which they might like to subscribe. A list of available distributions 250 can include pertinent details of the distributions, such as title, description, author, brokerage, product, and sector and can provide subscribe/unsubscribe buttons or hyperlinks 252 to allow the content consumer user to subscribe to or unsubscribe from distributions. A search input field 254 can be provided to allow searching the distributions, and filter selectors 256 can be provided to filter contents of the list of available distributions 250.

FIG. 12g shows a manger's interface configured to allow central management of several content producer users belonging to a firm. A list of content producer users 260 contains relevant information such as name, job title, number of subscribers, a number of email messages sent, an average open rate and count for sent email messages, and an average click rate and count for hyperlinks within the email messages. The open rate and link clicking rate are measured elements of interaction data 108, discussed above, which, along with the number of email messages sent, allow for a manager to quickly assess how effective each of his or her subordinates is performing. The information presented in the list of content producer users 260 can be searched via a search input field 264, filtered over time via date options 266, and pivoted based on key information 268 such as people (shown), distributions, clients, and firms. It should be noted that elements of the list 260, such as number of email messages sent, open rate, and click rate, can be recalculated based on searches, filters, or data pivots. Overall desk statistics 269 for the entire list of content producer users 260 can also be calculated and displayed.

FIG. 12h shows a compliance interface configured to allow managers or other users to ensure that all data required by relevant laws is recorded. The compliance interface can reference the unsubscribe and legal engine 90 and regulatory and compliance database 92 (FIG. 4). The compliance interface includes a compliance list 270 of sent email messages indicated by information such as sent timestamp, sender email address, email address of the distribution, recipient email address, and subject. The information presented in the compliance list 270 can be searched via a search input field 272 and exported to a local file using an export button or hyperlink 274.

FIG. 12i shows a user profile interface that contains editable user data 280 for a content producer user, including name, job, employer, and specialties, as well as statistics about the number of subscribers and distributions operated by the user. A list of subscription details 282 is also provided. Further shown in FIG. 12i, is the chat interface 208 in its opened state to permit entry and display of chat messages. The chat interface 208 may be the same or similar as the chat interface 172 of FIG. 10 and may operate in the same or similar manner.

In view of the above, it should be apparent that the techniques described herein offer numerous advantages to content producer parties, content consumer parties, and third parties involved in the creation, distribution, and consumption of financial information and data. Content producer parties are provided with a single system through which their content can be disseminated. Furthermore, content producer parities may access analytics about content consumer engagement with their content, and such engagement can be complemented with actual financial transaction data. Content consumer users, on the other hand, benefit from a single system with which manage subscriptions and discover new content from various sources. Third-party users benefit from access to a marketplace for original content that may not otherwise exist. Further advantages will also be apparent to those skilled in the art.

While the foregoing provides certain non-limiting example embodiments, it should be understood that combinations, subsets, and variations of the foregoing are contemplated. The monopoly sought is defined by the claims.

What is claimed is:

1. A content distribution system comprising:
a content subscription manager configured to control distribution of content provided by content producer computers to content consumer computers over a computer network;
a content producer interface configured to content the content subscription manager to the content producer computers;
a content consumer interface configured to connect the content subscription manager to the content consumer computers;
an analytics engine configured to receive indications of interactions with content by the content consumer computers, each of the interactions being an interaction by an individual content consumer user through a content consumer computer, and the analytics engine configured to receive out-of-band transaction data of content consumer computers associated with the content consumer firms, the out-of-band transaction data being received in a form that associates financial transaction data of at least one individual content consumer user from a plurality of individual content consumer users associated with one of a plurality of content consumer firms with one individual content producer user from a plurality of individual content producer users associated with one of a plurality of content producer firms, each user of the plurality of individual content consumer users and the plurality of individual content producer users being inked to a respective firm by a firm identifier stored in a data structure that defines each user;
the analytics engine further configured to generate correlations between the interactions with the content and the out-of-band transaction data and output the correlations to the content produce computers; and
a transaction data interface configured to receive the out-of-band transaction data, the transaction data interface included a normalizer configured to normalize dissimilar formats of the out-of-band transaction data into a common interface for use by the analytics engine, out-of-band transaction data and a dissimilar format thereof being inked to each firm by a respective firm identifier.

2. The system of claim 1, further comprising a distribution engine that is configured to distribute the content within electronic messages to the content consumer computers in conformance with distributions and rules established at the content subscription manager.

3. The system of claim 1, further comprising a message tracking engine configured to monitor for the indications of interactions with the content within electronic messages.

4. The system of claim 3, wherein the indications of interactions comprise one or more of:
electronic message opening as indicated by loading of a tracking image inserted into an electronic message;
electronic message viewing duration as indicated by monitoring delivery status of a tracking image inserted into an electronic message; and
following of hyperlinks within electronic messages.

5. The system of claim 3, further comprising an alert generator configured to send alert messages to the content producer computers based on evaluation of triggering conditions for the indications of interactions.

6. The system of claim 1, further comprising a messaging interface configured to allow electronic messaging communication between the content producer computers and the content consumer computers, the messaging interface further configured to display at a particular content producer computer out-of-band transaction data for a particular content consumer firm engaging in electronic messaging communication with a particular content producer user at the particular content producer computer.

7. The system of claim 1, further comprising an information bounty system configured to receive content from the content producer computers in response to requests for content by the content consumer computers.

8. The system of claim 1, further comprising a search engine configured to index the content and provide relevant content to the content consumer computers in response to search queries received from the content consumer computers, the search engine further configured to provide indications of interactions with the relevant content to the analytics engine.

9. The system of claim 1, wherein the out-of-band transaction data is representative of financial transactions between the content consumer firms content producer firms with the content producer computers.

10. A method for content distribution comprising:
receiving content from an individual content producer computer of a plurality of individual content producer computers associated with one of a plurality of content producer firms;
distributing the content to an individual content consumer computer of a plurality of individual content consumer computers associated with one of a plurality of content consumer firms via a computer network;
receiving an indication of an interaction with the content by the individual content consumer computer, the interaction being performed by an individual content consumer user through the content consumer computer;
receiving via the computer network out-of-band transaction data of a content consumer computers associated with the content consumer firms, the content consumer firm containing a plurality of individual content consumer users, the out-of-band transaction data being received in a form that associates financial transaction data of at least one individual content consumer user from the plurality of individual content consumer users associated with one of the plurality of content consumer firms with one individual content producer user from a plurality of individual content producer users associated with one of the plurality of content producer firms, each user of the plurality of individual content consumer users and the plurality of individual content producer users being linked to a respective firm by a firm identifier stored in a data structure that defines each user;
normalizing dissimilar formats of the out-of-band transaction data into a common format, the out-of-band transaction data and a dissimilar format thereof being linked to each firm by a respective firm identifier;
generating a correlation between the interaction with the content and the out-of-band transaction data; and
outputting the correlation to the content producer computer.

11. The method of claim 10, further comprising determining a distribution and a rule for distributing the content to a plurality of the content consumer computers.

12. The method of claim 10, comprising distributing the content to a content consumer computer within an electronic message, and further comprising monitoring for the indication of an interaction with the content in the electronic message.

13. The method of claim 12, wherein the indication of an interaction comprises:
electronic message opening as indicated by loading of a tracking image inserted into an electronic message;
electronic message viewing duration as indicated by monitoring delivery status of a tracking image inserted into an electronic message; or
following of a hyperlink within the electronic message.

14. The method of claim 12, further comprising sending an alert message to the content producer computer based on an evaluation of a triggering condition for the indication of an interaction.

15. The method of claim 10, further comprising:
electronic messaging between the content producer computer and the content consumer computer; and
displaying in a messaging interface at the content producer computer the out-of-band transaction data for the content consumer firm.

16. The method of claim 10, further comprising receiving content from the content producer computer in response to a request for the content by the content consumer computer.

17. The method of claim 10, further comprising:
providing relevant content to the content consumer computer in response to a search query received from the content consumer computer; and
receiving an indication of an interaction with the relevant content.

18. The method of claim 10, wherein the out-of-band transaction data is representative of financial transactions between the content consumer firm and a content producer firm associated with the content producer computer.

* * * * *